Aug. 2, 1960

H. GANG 2,947,476

SELECTIVELY OPERABLE STOPPING MEANS FOR CALCULATING MACHINES IN MULTIPLICATION

Filed Aug. 21, 1957

5 Sheets-Sheet 1

INVENTOR.
HERMAN GANG
BY
George V. Hall
ATTORNEY.

Aug. 2, 1960 H. GANG 2,947,476

SELECTIVELY OPERABLE STOPPING MEANS FOR CALCULATING MACHINES IN MULTIPLICATION

Filed Aug. 21, 1957

5 Sheets-Sheet 2

INVENTOR.
HERMAN GANG

BY George C. Hall
ATTORNEY.

Aug. 2, 1960

H. GANG 2,947,476

SELECTIVELY OPERABLE STOPPING MEANS FOR CALCULATING MACHINES IN MULTIPLICATION

Filed Aug. 21, 1957

5 Sheets-Sheet 3

INVENTOR.
HERMAN GANG

BY

George W. Hall
ATTORNEY.

Aug. 2, 1960 H. GANG 2,947,476

SELECTIVELY OPERABLE STOPPING MEANS FOR CALCULATING MACHINES IN MULTIPLICATION

Filed Aug. 21, 1957

5 Sheets-Sheet 4

INVENTOR.
HERMAN GANG
BY
George V. Hall
ATTORNEY.

INVENTOR.
HERMAN GANG
BY George V. Hall
ATTORNEY.

2,947,476

SELECTIVELY OPERABLE STOPPING MEANS FOR CALCULATING MACHINES IN MULTIPLICATION

Herman Gang, Morris Plains, N.J., assignor to Monroe Calculating Machine Company, Orange, N.J., a corporation of Delaware Filed Aug. 21, 1957, Ser. No. 679,430

4 Claims. (Cl. 235—63)

This invention relates to stopping means for calculating machines, and more particularly to such means operable to supersede the operation of stopping means normally operable to terminate a program of multiplication.

The invention is disclosed as embodied in a machine including multiplier entering and multiplication control means which operate respectively substantially in accordance with the disclosures of applicant's Patents 2,531,206 and 2,531,207.

The multiplier entering means operates to enter a multiplier value set in the ordinal key rows of the machine into a corresponding ordinal series of multiplier storage devices. The operation comprises an additive cycle of the registering mechanism followed by a subtractive cycle. The additive cycle registers the value set in the keyboard in the product register which is mounted in a shiftable register carriage. After this, the multiplier storage devices, also mounted in the carriage, are engaged with the wheels of the product register in which the multiplier is registered. The subtractive cycle then operates to transfer the multiplier value in the product register to the storage devices. At the conclusion of the subtractive cycle, the keyboard is automatically cleared so that a multiplicand may be set therein.

The set multiplier storage devices are successively retracted step by step to zero or home position during operation of the registering mechanism in registration of the product. During each cycle of the registering mechanism, a given storage device is retracted a digital step of movement toward home position. At the end of the cycle in which said given device is stepped to home position, the operation of the registering mechanism is interrupted, the register carriage is shifted one ordinal position and operation of the registering mechanism is reinitiated. In the shifting operation, the next successive order storage device is brought into position to be retracted as the registering mechanism is cycled. When the last storage device is restored to home position, operation of the machine will be terminated. Accordingly the multiplicand in the keyboard will be registered in the product register a number of times corresponding to the digital multiplier setting of each storage device.

Reference is made to the aforenoted Patents 2,531,206 and 2,531,207 for a complete disclosure of the multiplier entering and multiplication control mechanisms and their operations.

Often in a series of multiplying operations, one of the factors of each calculation of the series is a constant, and it would be desirable to lock the constant in the keyboard as a multiplicand. In consideration of the above, it is proposed to lock a constant multiplicand in one side of the keyboard and to use the other side for entry of the series of multipliers. This obviously cannot be done in a machine operating as outlined in the foregoing, for the reason that the multiplicand as well as the multiplier would be entered into the multiplier storage devices upon each multiplier entering operation.

It is accordingly the primary object of the invention to provide a machine having a single keyboard in which a multiplicand may be locked and in which a multiplier may be set for entry into the machine.

A more specific object of this invention is to provide control means selectively operable to terminate a program of multiplication after a given number of a series of multiplier storage devices have been successively restored to home position regardless of the setting of the remainder of the series.

A further object of the invention is to provide means for locking a constant factor in the keyboard of the machine, and as an incident to the locking operation to enable normally disabled means selectively operable to terminate a program of multiplication.

Other objects and advantages of the invention will be evident from the following description of a preferred embodiment thereof with reference to the accompanying drawings in which.

*The registering and carriage shifting mechanism*

Figure 1:
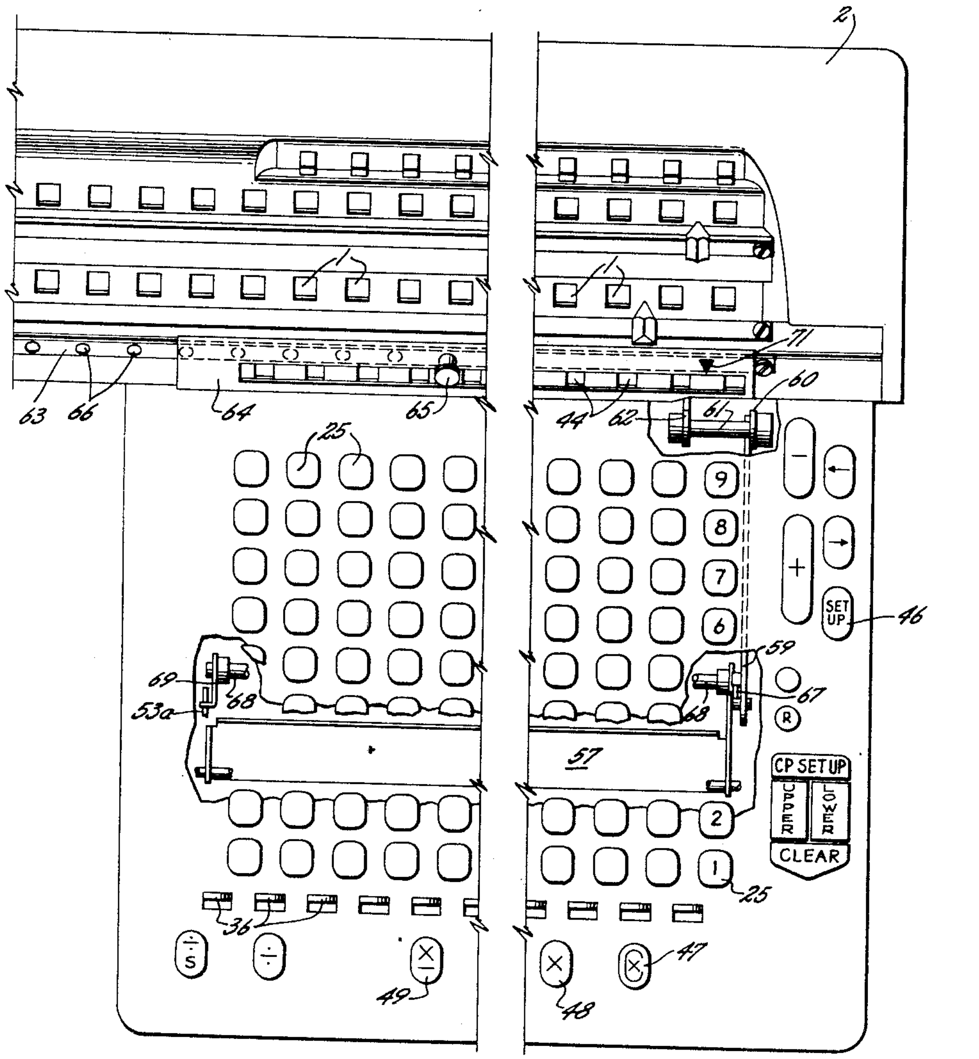
Fig. 1 is a plan view of a calculating machine with parts broken away embodying the invention.

The wheels 1 of the accumulator register (Figs. 1, 2) are mounted in the shiftable carriage 2 and are driven by digital actuators 3 and tens transfer actuators 4 through intermediate gears 5 and 6. Digital actuators 3 and tens transfer actuators 4 are mounted on shafts 7 and 8 respectively and are driven either forwardly or reversely at a 1 to 1 ratio by a gear train (not shown) which is exterior of the right side frame. The gear train is driven by a motor through a reversible clutch transmission generally indicated by the reference numeral 9 (Fig. 4) and a normally engaged friction clutch (not shown) which transmits power to a shaft 10 (Fig. 2) on which one of the drive gears of the train is mounted.

Carriage 2 is denominationally shiftable to the right or left by a worm and plunger drive 11 (Figs. 2, 4) which is driven by clutch transmission 9 through another friction clutch (not shown) which is engaged upon disengagement of the friction clutch for the actuator drive. Reference is made to the aforenoted Patent 2,531,207 for a complete disclosure of the registering and carriage shifting mechanism.

*The full cycle stopping means*

Additive or subtractive registration in connection with the various machine operations is effected by clockwise and counterclockwise movement respectively of a clutch lever 12 (Fig. 4) from a neutral position to engage clutch transmission 9. Likewise, rightward and leftward operation of the carriage shifting mechanism is effected by clockwise and counterclockwise movement respectively of said clutch lever and simultaneous engagement of the friction drive shift clutch.

Figure 4:
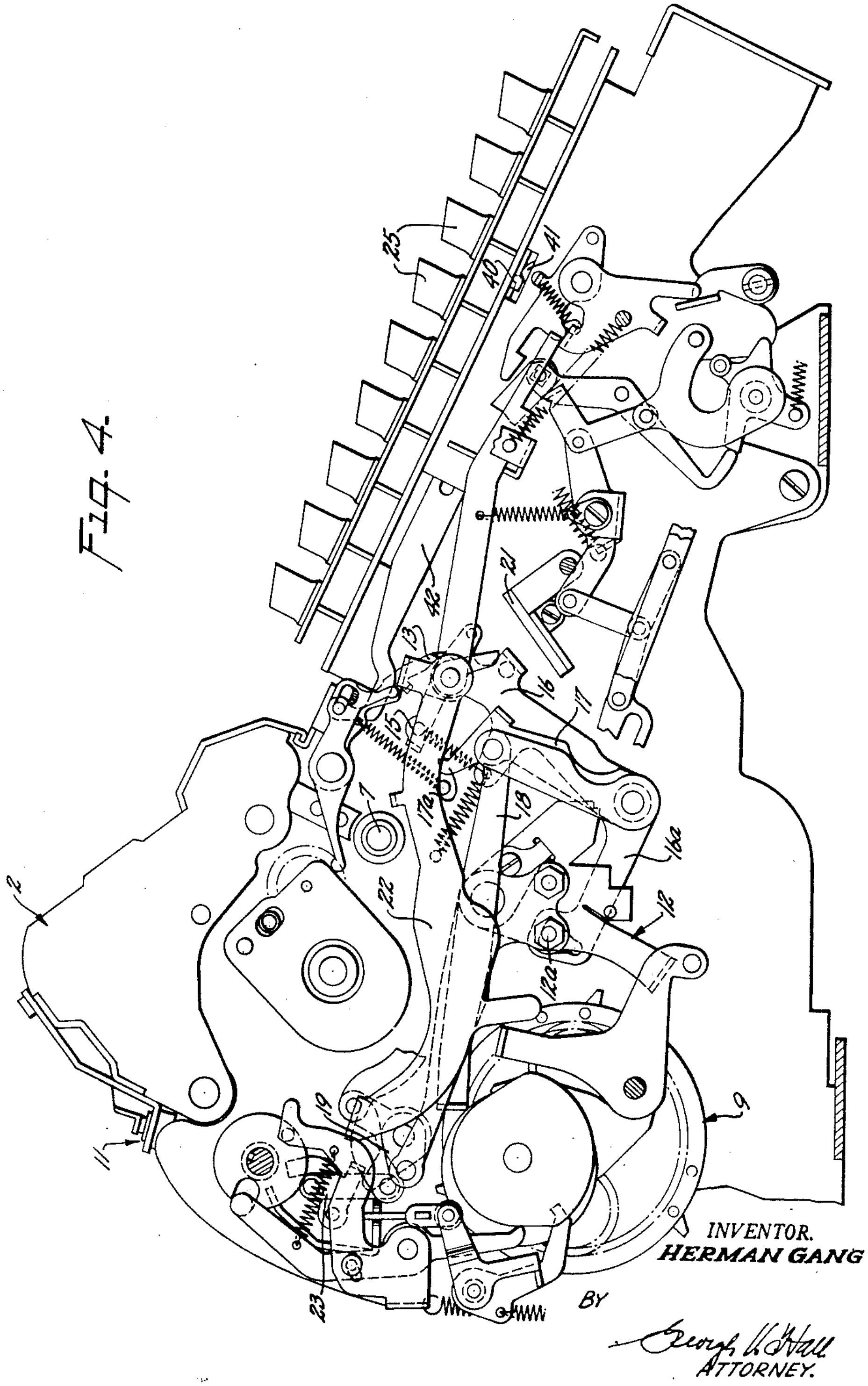
Fig. 4 is a left side elevation of the machine showing the reversible clutch transmission and the full cycle stopping means for the registering and carriage shifting mechanism.

Operation of the full cycle stopping means for the registering mechanism is initiated upon counterclockwise movement of a latch lever 13 from the position shown in Fig. 4. The rightmost end of lever 13 which is spring urged clockwise, normally engages a spring urged latch 15 thereby holding said latch in disengaged position. Latch 15 is mounted on the upper free end of a pivotally mounted arm 16 which is normally spring held counterclockwise against a fixed stop. Latch 15 is adapted for engagement with a shoulder 17a at the upper end of a rock arm 17 which has common pivotal mounting with arm 16. Arm 17 is rocked clockwise from the position of Fig. 4 and returned, once for each cycle of the registering mechanism, by a link 18 and a crank 19 which is driven in time with the registering mechanism.

Upon counterclockwise movement of lever 13, latch 15 will be released and spring moved counterclockwise for engagement with shoulder 17a of arm 17. Therefore as arm 17 passes through full cycle position, its shoulder will engage latch 15 and rock arm 16 in unison with said arm 17 and against a fixed stop 21. Arm 16 is provided with an extension 16a which has at its free end a cam slot adapted to engage a pin 12a of the clutch lever 12. Therefore when arm 16 is moved against stop 21, the cam slot will engage pin 12a thereby moving clutch lever 12 from its additive or from its subtractive position to neutral position to disconnect the drive to the registering mechanism. Thereupon arms 16 and 17 will rebound from stop 21 in the reverse direction to full cycle position whereat the registering mechanism and connected parts will be located. In this reverse movement of the parts, latch 15 will be disengaged by lever 13 which will have been restored to normal clockwise position after its releasing operation.

Movement of arm 16 clockwise to stop 21 also effects operation of the full cycle stopping means for the carriage shifting mechanism. A rearwardly extending link 22 is pivotally mounted at its front and to the upper end of arm 16. At its rear, link 22 is pivotally supported at the end of a depending crank 23. A stopping operation for the carriage shifting mechanism is effected by means operable to move link 22 toward the front of the machine. Upon movement of link 22 toward the front of the machine, arm 16 will be rocked clockwise and extension 16a thereof will centralize clutch lever 12 thereby disengaging the drive as described in connection with the stopping means for the registering mechanism and disengaging the friction shift clutch.

*The digital value selection means*

A keyboard having a row of 1 to 9 digital value keys 25 (Figs. 1, 2, 7) for each digital actuator 3 comprises means for selecting values to be entered into said actuators. Keys 25 of each row are held in retracted position by a spring 26 common to all of the keys of the row and engaging a shoulder at the right side of the end of each key stem.

Each row of keys 25 has a latch slide 28 which is adapted to hold any key in the related row in depressed position and upon depression of any key in the row the slide is moved to release any depressed key. Slide 28 is spring urged toward the front of the machine and has a series of depending lugs 28a each adapted to be engaged by a shoulder 25a at the left side of the end of the stem of a respective key 25. Upon depression of a key 25, its shoulder 25a will engage a cam face of the related lug 28a and move the related slide 28 to the rear. As shoulder 25a passes below lug 28a, slide 28 will be allowed movement by its spring toward the front of the machine thereby positioning lug 28a above shoulder 25a to hold key 25 in depressed position.

Each lug 28a has an inclined face at its forward underside. Therefore if a key 25 is latched in depressed position, and another key in the same row is depressed, the inclined face at the underside of lug 28a related to the latched key will be moved to the rear of shoulder 25a of the key. Spring 26 will then be effective to raise the key to retracted position and the key now depressed will be latched upon forward movement of slide 28.

Keys 25, upon depression, perform no operation other than to position the ends of their stems to control a subsequent setting operation. The first part of each cycle of registration comprises an idle phase of operation. During this idle phase of operation means differentially operable under control of the keyboard settings is effective to set actuators 3 to the values corresponding to the digital settings in the respective key rows. The present invention is not concerned with the setting operation and reference is made to applicant's Patent 2,756,933 and pending application, Ser. No. 435,435, filed June 9, 1954 (Patent No. 2,910,230 issued Oct. 27, 1959) for a complete disclosure thereof.

*Keyboard clearing means and column locks*

The keyboard clearing means comprises a bell crank 29 (Fig. 7) operatively associated with latch slide 28 of the key rows. Crank 29 has a rightwardly extending arm, the rear edge of which engages a lug 28b at the upper edge of the associated slide 28. A rearwardly extending arm of the crank 29 engages a recess at the upper edge of a transverse slide 30 which extends across the machine above latch slides 28.

The right end of slide 30 is engaged by the forwardly extending arm of a bell crank 31, the other arm of which extends toward the right and is adapted to be engaged by the upper end of a trigger 32. As later described, the upper end of trigger 32 is moved forwardly to engage the rightwardly extending arm of bell crank 31 and rock said crank clockwise. Upon clockwise movement of crank 31, slide 30 will be moved toward the left thereby rocking bell cranks 29 counterclockwise. Upon counterclockwise movement of bell cranks 29, latch slides 28 respectively will be moved toward the rear thereby releasing any keys 25 which may be in set position.

A manually settable lock slide 34 (Figs. 2, 7) is operable to render the keyboard clearing means ineffective for each column of keys 25. Slide 34 extends from front to rear below the stems of keys 25 of the associated key row. To the rear of the stem of each of the keys is a lug 34a extending forwardly from the upper edge of slide 34. Lug 34a is adapted to engage an opening 25b in the stem of key 25. When key 25 is in retracted position, the lower end of its key stem will be raised above lug 34a. However, when key 25 is in depressed set position opening 25b will be aligned with the forward path of movement of lug 34a.

A toggle spring 35 normally holds each lock slide 34 toward the rear in inactive position. When it is desired to lock a set key in a particular key row against retraction upon operation of the clearing means, slide 34 of the row will be moved forwardly by a button 36 slidably mounted on a suitable supporting rod 36a and engaging a recess 34c at the end of an upwardly extending arm at the front of the slide. Upon forward movement of slide 34, lug 34a normally to the rear of the stem of the depressed key, will enter opening 25b of said key stem. Therefore, when the clearing means operates and latch slides 28 are moved to the rear to release the set keys, the depressed key in the column in which lock slide 34 has been set will be restrained against retraction. When a slide 34 is moved forwardly to locking position, toggle spring 35 will operate to hold the slide in set position until manually adjusted toward the rear.

Upon operation of the keyboard clearing means by bell crank 31 (Fig. 7) means is simultaneously operable to initiate operation of the full cycle stopping means for the registering mechanism previously described. A bell crank 37 is located immediately above crank 31 and has common pivotal mounting therewith. An upwardly extending lug 31a at the rear of the rightwardly extending arm of crank 31 engages the rear of a rightwardly extending arm of crank 37. Consequently, when crank 31 is rocked clockwise by trigger 32, crank 37 will be rocked simultaneously therewith.

Figure 5:
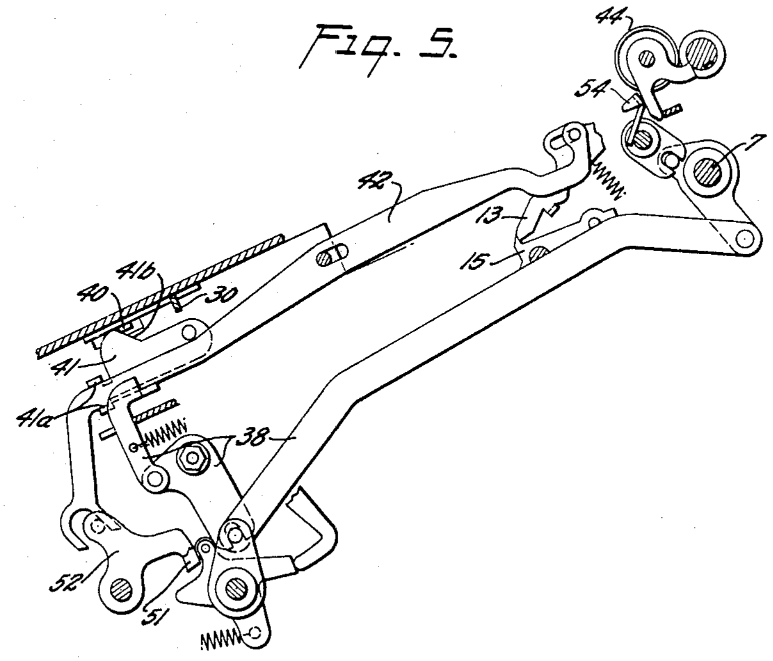
Fig. 5 is a fragmentary right side detail view of the multiplication control devices associated with the stopping means and with the parts in normal position.
Figure 6:
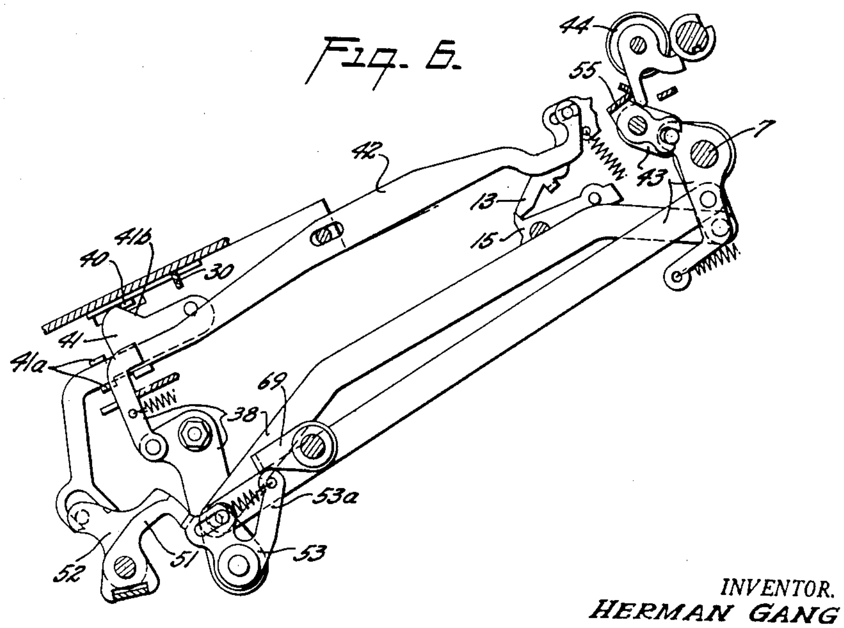
Fig. 6 is a view similar to Fig. 5 with additional parts and with the parts in an operated position.

A forwardly extending arm of crank 37 engages the right end of a transverse slide 39. The left end of the slide 39 engages a rearwardly extending arm of a bell crank 40 which is spring biased clockwise. A leftwardly extending arm of crank 40 engages a cam surface at the upper forward end of an arm 41 (Figs. 5, 6) which is pivotally mounted at its rear on the inner face of the machine's left side frame. Arm 41 has a pair of opposed lugs 41*a* at its forward end which engage the upper and lower edges respectively of a rearwardly extending lever 42. Lever 42 (Figs. 4, 5, 6) is pivotally mounted intermediate its ends on the inner face of the left side frame, and is bent outwardly through a cutout; from there it extends toward the rear outwardly of said frame. Lever 42 has slot and pin connection at its rear with lever 13 which holds latch 15 of the stopping means in disabled position.

Figure 7:
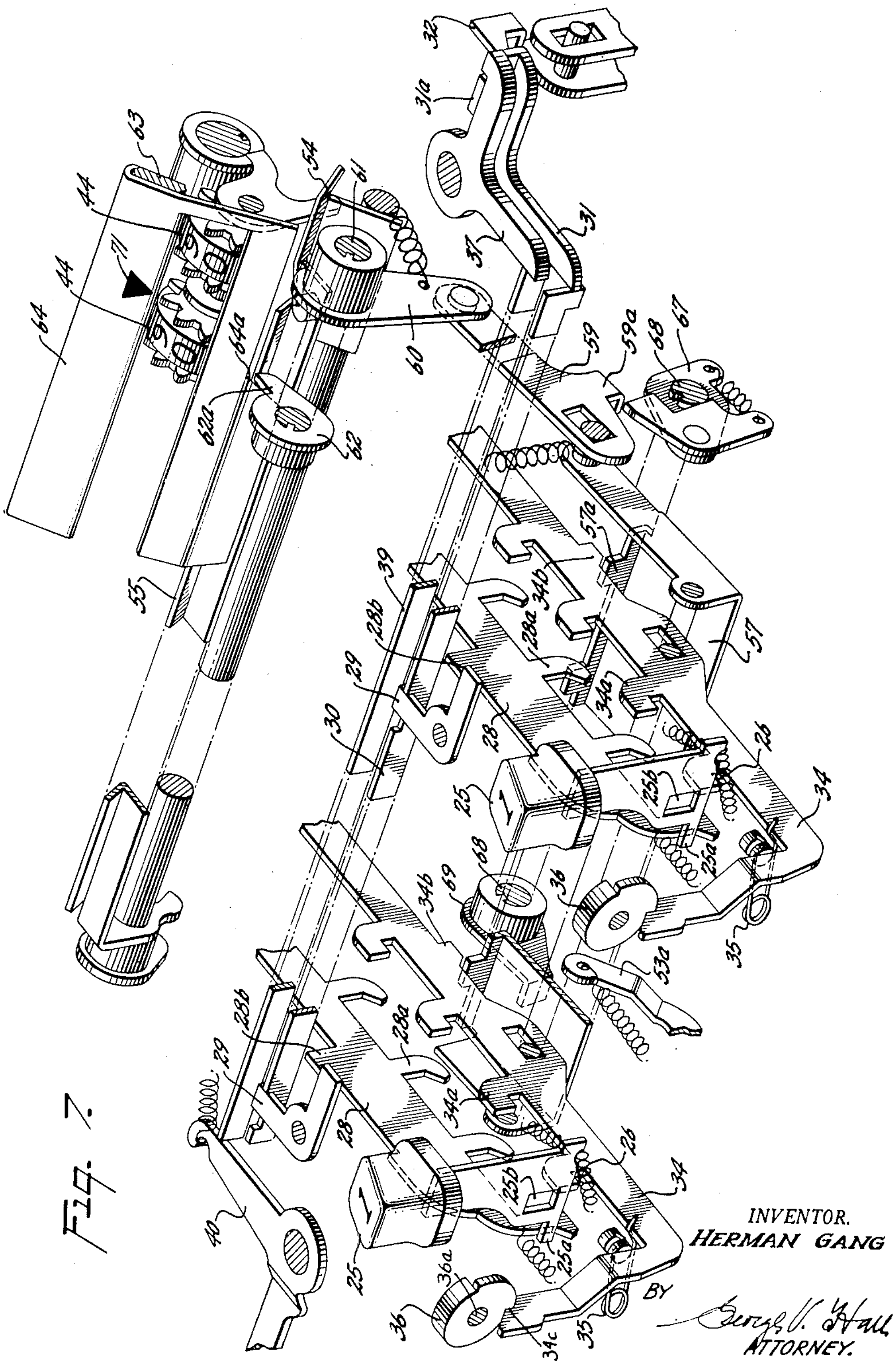
Fig. 7 is a fragmentary perspective view of the keyboard, the multiplier storage devices and associated mechanism.

In connection with the multiplier entering operation later described, trigger 32 (Fig. 7) is adapted to be operated in time with an additive cycle of operation and then again in time with a subtractive cycle. During the additive cycle, crank 37 will be rocked by trigger 32 independently of crank 31. This will move slide 39 to the left and rock crank 40 counterclockwise (Fig. 7). Upon counterclockwise movement of crank 40, the leftwardly extending arm thereof (Figs. 4, 5, 6) will be effective to engage a cam edge 41*b* of arm 41 and rock said arm and lever 42 connected therewith to raise lever 13 and release latch 15 thereby operating the full cycle stopping means. During the subtractive cycle, trigger 32 will be effective to rock crank 31. Lug 31*a* will rock crank 37 simultaneously with crank 31. Consequently, both the clearing and full cycle stopping means will be operated.

*Multiplier storage devices and multiplier entering operation*

Figures 2, 3:
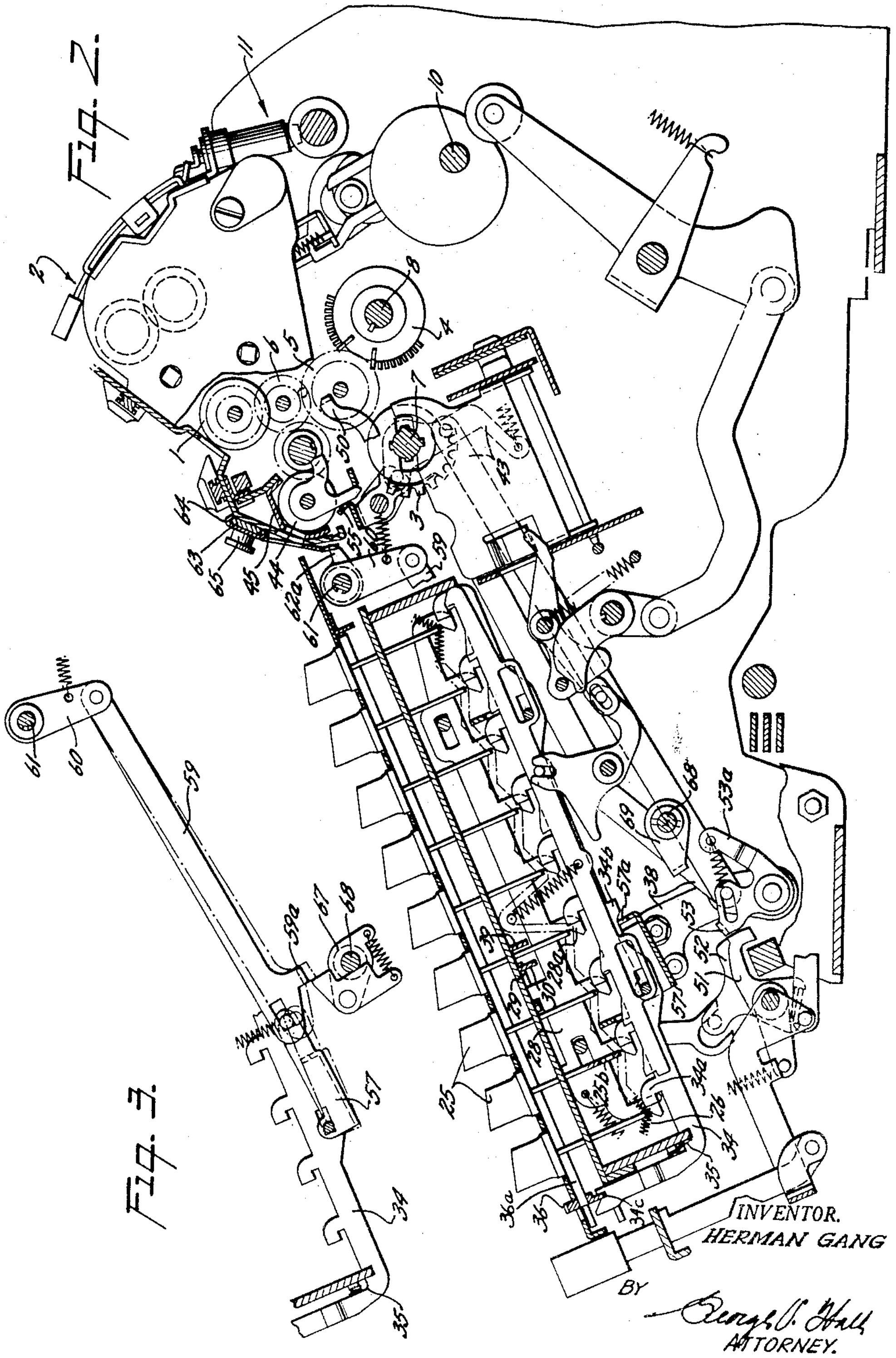
Fig. 2 is a vertical section showing the keyboard, the registering mechanism and the multiplier storage devices.
Fig. 3 is a side elevation of a detail of the secondary stopping means.

The multiplier storage devices comprise an ordinal series of wheels 44 (Figs. 1, 2, 7). The series of storage devices is mounted in a sub-carriage 45 which is longitudinally adjustable to ordinal positions with respect to accumulator wheels 1 in main carriage 2. Normally, however, sub-carriage 45 is in right end position within main carriage 2 and the present invention is not concerned with its ordinal adjustment. There is a storage wheel 44 for each column of keys 25 of the keyboard, and a multiplier entering operation is effected with carriage 2 in leftmost shifted position so that the storage wheels will be ordinally aligned with the corresponding key columns.

A value set in keys 25 of the keyboard will be entered into the corresponding order storage devices 44 in response to depression of a set-up key 46 (Fig. 1). Upon depression of key 46, carriage 2 will be automatically shifted to its left end position if displaced therefrom, and a single additive and then a single subtractive cycle of the registering mechanism will be effected. Upon operation of the additive cycle, the value set in the keyboard will be registered in accumulator wheels 1. During the cycle of operation, trigger 32 will be raised from the position of Fig. 7 and will be forwardly operated in time with the registering mechanism. Because of its raised position, trigger 32 will be effective, when operated, to engage the right end of crank 37 independently of crank 31. Crank 37 therefore will be rocked independently of crank 31 to operate the full cycle stopping means while the set value is retained in the keyboard.

At the conclusion of the additive cycle of operation, means is automatically operable to initiate the substractive cycle. During the subtractive cycle, sub-carriage 45 will be in a shifted position where the normally disengaged storage devices 44 will be engaged with the corresponding orders of accumulator wheels 1. Therefore during the subtractive cycle, the values registered in wheels 1 will be transferred to storage devices 44. Furthermore, during the subtractive cycle of operation, trigger 32 will be in lowered position and will be moved to operate crank 31. As previously described, crank 37 will be operated simultaneously with crank 31, and therefore both the keyboard clearing means and the full cycle stopping means will be operated. The machine will be brought to rest upon termination of the subtractive cycle and then a multiplicand may be entered into the cleared keyboard for the subsequent program of multiplication.

Reference is made to applicant's Patent 2,531,206 for a complete disclosure of the multiplier entering mechanism and its operation.

*Multiplication*

Multiplication is initiated upon depression of either one of three multiplier keys 47, 48 or 49 (Fig. 1). Key 48 provides for positive multiplication; key 49 provides for negative multiplication; and key 47 provides for certain ancillary operations in conjunction with positive multiplication. The devices of the present invention, however, operate the same regardless of the type of multiplication so therefore the program will be considered in connection with depression of any one of said multiplier keys.

The program is initiated with register carriage 2 in its left end position. In response to depression of the multiplier key, a pair of cranks 51 and 52 are rocked counterclockwise from the position of Figs. 2, 5 to the position of Fig. 6, and a common latch 53 is moved beneath a nose on each crank to hold them in counterclockwise position. Furthermore, in response to depression of the multiplier key, operation of the register mechanism will be initiated.

A counting finger 50 (Fig. 2) is operable in time with the registering mechanism to retract storage devices 44, from lower to higher orders, successively to home position. Upon each cycle of operation of the registering mechanism counting finger 50 is operable to retract a given storage device 44 one digital step of movement. Upon movement of the storage device to home position, a bail 54 (Figs. 5, 7) is restored clockwise and through a suitable transmission train 38 (Figs. 5, 6) is operable to rock lever 42 to initiate operation of the full cycle stopping means. However as long as any other storage wheel 44 remains in a set position, cranks 51, 52 will be held in counterclockwise position (Fig. 6) by latch 53 and the program of operations will be continued.

To continue the program of operations, operation of the stopping means only interrupts or suspends operation of the registering mechanism and as an incident thereto a single ordinal operation of the carriage shifting mechanism is effected. This will move the next successive higher order storage device 44 into position to be retracted upon operation of the counting fingers 50. Upon operation of the full cycle stopping means for the carriage shifting operation, reinitiation of the registering mechanism will be effected and counting fingers 50 will be again operable to retract the associated storage devices 44. This program of operations will continue until all of the storage devices have been retracted to home position.

Upon movement of the last storage device to home position not only will bail 54 be rocked clockwise but a bail 55 (Figs. 6, 7) will also be rocked simultaneously therewith. Upon clockwise movement of bail 55, a suitable transmission train 43 connected therewith will restore latch 53 clockwise thereby releasing cranks 51, 52 so that they will be restored to the clockwise position of Fig. 2.

Movement of cranks 51, 52 to normal clockwise position will adjust the multiplication control mechanism so that operation of the full cycle stopping means either for the registering or for the carriage shifting mechanism will not reinitiate operation of the machine. As a result, the program of multiplication will be terminated. Reference is made to applicant's Patent 2,531,207 for a complete disclosure of the multiplication control mechanism and its operation.

*The secondary terminating means*

The present invention comprises what may be termed secondary terminating means when considered with respect to the previously described primary terminating means which normally terminates a program of multiplication when the last of a series of multiplier storage devices 44 (Figs. 1, 2, 7) have been restored. The secondary terminating means is normally disabled and is selectively settable so that a program of multiplication may be terminated after a given storage device 44 is restored to zero regardless of the setting of the higher order storage devices.

Extending transversely beneath lock slides 34 of the keyboard is a bail 57 (Figs. 2, 3, 7) which is spring urged counterclockwise. A cross member of bail 57 includes a series of lugs **57*a* which extend upwardly and terminate respectively immediately adjacent the lower edges of lock slides 34 respectively. To the rear of each lug 57*a* is a cam lug 34*b* extending downwardly from the lower edge of the associated lock slide 34. Cam lug 34*b* has an inclined edge which is immediately adjacent and to the rear of lug 57*a*. Consequently when lock slide 34 is adjusted forwardly to lock a set key in the associated row, the inclined edge of lug 34*b* will engage lug 57*a* thereby rocking bail 57** clockwise from the full line position of Figs. 2, 3, 7 to the dot-dash position of Fig. 3.

Bail 57 has a rearwardly extending arm at its right end which has pin and slot connection with the forward end of a link 59. Link 59 extends toward the rear and is there pivotally connected with the end of a depending crank 60 which is fast on a shaft 61 which extends transversely at the front of bails 54, 55. Fast on shaft 61, to the left of crank 60, is a collar 62 on which is a rearwardly extending finger **62*a*. Crank 60 is spring urged counterclockwise thereby normally holding link 59** toward the rear.

A longitudinally adjustable slide 64 (Figs. 1, 2, 7) is mounted on a rail 63 on the front of main carriage 2 at the front of multiplier storage wheels 44. Slide 64 is normally in rightmost adjusted position and is adjustable toward the left to a series of ordinal positions. A spring urged plunger 65 at the front of slide 64 is adapted to engage any one of a series of ordinally spaced holes 66 in rail 63 to hold slide 64 in adjusted position. When slide 64 is in rightmost adjusted position, a cam edge **64*a* thereof is immediately to the left of finger 62*a* of collar 62**.

A depending lug **59*a* of link 59 is normally located immediately to the rear of a yieldably mounted arm of a crank 67 which is fast on the right end of a transverse shaft 68. Adjacent the left end of shaft 68 and fast thereon is a forwardly extending finger 69 which terminates above a rearwardly extending arm 53*a* of latch 53. When latch 53 is in normal unset clockwise position (Fig. 2), the end of finger 69 will be a distance above arm 53*a* to permit counterclockwise movement of the latch to set position. When latch 53 is set counterclockwise (Fig. 6), arm 53*a* will be brought to a position immediately below the end of finger 69**.

As carriage 2 is shifted toward the right in a program of multiplication, cam edge **64*a* of slide 64 will be moved into engagement with finger 62*a* of collar 62. If slide 64 is in its rightmost adjusted position, this engagement will occur during the carriage shift which immediately follows retraction of the lowest order storage device 44 to home position. Thus it will be seen that slide 64 may be adjusted toward the left so that cam edge 64*a* will engage finger 62*a*** during the carriage shift immediately following retraction of any given higher order storage device.

Upon engagement of finger **62*a* by cam edge 64*a*, shaft 61 and crank 60 will be rocked clockwise thereby moving link 59 toward the front of the machine. If bail 57 is in the normal counterclockwise position shown in the drawings, lug 59*a* will move idly above crank 67. However, if any one of the lock slides 34 has been moved forwardly to locking position, a lug 34*b* will have engaged a lug 57*a* thereby rocking and holding bail 57 clockwise as shown by the dot-dash position of Fig. 3. Clockwise movement of bail 57 will lower the front end of link 59 so that the arm of crank 67 is in the forward path of movement of lug 59*a*. Consequently, when carriage 2 is shifted and cam edge 64*a* of slide 64 is effective to rock crank 60 and move slide 59 forwardly, lug 59*a* will engage crank 67 and rock it counterclockwise. Upon counterclockwise movement of shaft 68, the front end of finger 69 will be lowered and will engage arm 53*a* of latch 53 thereby rocking said latch clockwise from engagement with cranks 51, 52. Cranks 51, 52 will then be restored to the normal clockwise position of Figs. 2, 5 and therefore operation of the full cycle stopping means for the carriage shift operation will be ineffective to reinitiate operation of the registering mechanism. As a result, the program of multiplication will be terminated regardless of the settings of the higher order storage devices 44**.

If a lock slide 34 is set to active position while carriage 2 is in a right shifted position, link 59 may be in forward idly operated position. Therefore, when slide 34 is set, link 59 will be lowered to a position at the front of crank 67. If after this carriage 2 is shifted to leftmost position for a program of multiplication, link 59 will be restored toward the rear and in this operation the yieldable arm of crank 67 will permit passage of lug **59*a*** to the rear.

*Operation*

A constant factor multiplicand will be set in a series of the higher order key rows (Fig. 1). Then lock slide 34 (Figs. 2, 7) of each of the rows will be adjusted forwardly to locking position. This will enable the secondary terminating means, and lock the multiplicand in the keyboard. When operating slide 64 is in rightmost adjusted position (Figs. 1, 7), the carriage shift following retraction of the lowest order storage wheel 44 will terminate the operation as indicated by the marker 71 on the slide. The maximum number of multiplier digits is therefore determined and slide 64 will be adjusted to locate marker 71 to the left of the highest order storage wheel into which a multiplier digit will be entered. A multiplier will then be set in the lowest orders of the keyboard and key 46 depressed to initiate the entering operation.

In the multiplier entering operation, both the multiplier and the multiplicand set in the keyboard will be entered into the respective storage wheels 44. The clearing operation, however, upon termination of the entering operation will be effective to clear only the multiplier from the keyboard. The subsequent program of multiplication will be terminated in response to the carriage shift following retraction of the highest order storage device 44 into which a multiplier digit is entered.

It may be that a multiplier comprises a lesser number of digits than the maximum for which slide 64 is set. In this instance, a plural order carriage shift will be instituted after retraction of the device 44 into which the highest order multiplier digit is entered. This will bring slide 64 into position to operate the stopping means at the end of the current shift cycle. This plural shift operation is effected in accordance with the disclosure of the aforenoted Patent 2,531,207 wherein means is provided to shift carriage 2 through one or more orders to bring a higher order set storage device into position for retraction by the counting means.

I claim:

1. In a calculating machine having a register, differentially settable actuators for said register, selection means for setting said actuators including ordinal rows of settable digital value keys, clearing means operable to restore said keys from set position, an ordinal series of multiplier storage devices each differentially settable from a home position, means for initiating operation of said actuators; means operable to restore a series of set storage devices successively to home position during operation of said actuators; and primary terminating means operable in response to movement of the last set device of said series to home position to terminate operation of said actuators; normally disabled secondary terminating means selectively settable and operable in response to movement of any given device to home position to terminate operation of said actuators thereby superseding operation of said primary terminating means, settable locking means for each key row for holding any set key of said row against retraction upon operation of said clearing means, and means operable upon setting of one of said key locking means to enable said secondary terminating means.

2. In a calculating machine having a register, differentially settable actuators for said register, selection means for setting said actuators including ordinal rows of settable digital value keys, an ordinal series of multiplier storage devices each differentially settable from a home position, multiplier entering means operable to enter a value set in said key rows into respective orders of said storage devices, clearing means operable upon termination of operation of said multiplier entering means to restore said keys from set position, means for initiating operation of said actuators, means operable to restore a series of set storage devices successively to home position during operation of said actuators, and primary terminating means operable in response to movement of the last set device of said series to home position to terminate operation of said actuators; settable locking means for each key row for holding any set key of said row against retraction upon operation of said clearing means, normally disabled secondary terminating means selectively settable and operable in response to movement of any given device to home position to terminate operation of of said actuators thereby superseding operation of said primary terminating means, and means operable upon setting of one of said key locking means to enable said secondary terminating means.

3. In a calculating machine having a shiftable carriage, a register thereon, an ordinal series of multiplier storage devices thereon each differentially settable from a home position, an ordinal series of differentially settable actuators for said register, means for ordinally shifting said carriage with respect to said actuators, selection means for setting said actuators including ordinal rows of settable digital value keys, clearing means operable to restore said keys from set position, counting means operable when said carriage is in successive ordinal positions to restore ordinally corresponding devices respectively during operation of said actuators, means operable to initiate operation of said actuators, means operable upon movement of any device to home position with any other device in set position to interrupt operation of said actuators, means operable upon interruption of the operation of said actuators to initiate a single ordinal shifting operation of said carriage shifting means, means operable upon termination of said carriage shifting operation to reinitiate operation of said actuators, and primary terminating means operable upon movement of any device to home position with all other devices in home position to terminate operation of said actuators; normally disabled secondary terminating means selectively settable and operable in response to movement of any given device to home position to terminate operation of said actuators thereby superseding operation of said primary terminating means, settable locking means for each key row for holding any set key of said row against retraction upon operation of said clearing means, and means operable upon setting of one of said key locking means to enable said secondary terminating means.

4. The invention according to claim 3 wherein said secondary terminating means includes said carriage shifting means.

References Cited in the file of this patent

UNITED STATES PATENTS

| | | |
|---|---|---|
| 1,292,513 | Rechnitzer | Jan. 28, 1919 |
| 2,157,411 | Hopkins | May 9, 1939 |
| 2,382,661 | Pott | Aug. 14, 1945 |
| 2,531,205 | Gang | Nov. 21, 1950 |
| 2,531,206 | Gang | Nov. 21, 1950 |
| 2,531,207 | Gang | Nov. 21, 1950 |
| 2,531,208 | Gang | Nov. 21, 1950 |
| 2,546,893 | Hilder | Mar. 27, 1951 |
| 2,753,114 | Ellerbeck | July 3, 1956 |

FOREIGN PATENTS

| | | |
|---|---|---|
| 156,715 | Great Britain | 1921 |